UNITED STATES PATENT OFFICE.

NOEL STATHAM, OF HASTINGS-UPON-HUDSON, NEW YORK, ASSIGNOR TO WEST VIRGINIA PULP AND PAPER COMPANY, OF NEW YORK, N. Y., A CORPORATION OF DELAWARE.

CAUSTICIZED ORGANIC MATERIAL AND PROCESS OF MAKING THE SAME.

1,298,594. Specification of Letters Patent. Patented Mar. 25, 1919.

No Drawing. Application filed March 5, 1918. Serial No. 220,463.

*To all whom it may concern:*

Be it known that I, NOEL STATHAM, a subject of the King of Great Britain, now residing at Hastings-upon-Hudson, county of Westchester, State of New York, have made a certain new and useful Invention Relating to Causticized Organic Material and Processes of Making the Same, of which the following is a specification.

This invention relates especially to causticized organic material which may be produced from the waste liquors from wood pulp paper manufacture. The waste soda liquor may, for instance, be concentrated until it contains about fifty per cent. of water and then causticized by incorporating therewith forty to sixty per cent. or so of powdered quicklime to produce a strong permanently solid causticized organic material of porous cellular structure and yet having such strength as to be correspondingly more desirable for the subsequent dry distillation, calcination and leaching treatments to which it may be subjected.

The soda or waste black liquor from the caustic soda process of producing paper pulp from deciduous woods and so forth may be concentrated as in multiple effect evaporators until the resulting concentrated black liquor contains about fifty per cent. of water and has a specific gravity of about 1.32, and in some cases additional amounts of caustic soda may be incorporated with the waste soda liquor at about the time of its final concentration or somewhat previous thereto to the extent of some five to ten per cent. thereof; and still greater amounts of caustic soda may with advantage be used in some cases with waste sulfite liquor which seems to effect a conversion of the incorporated or dissolved organic matter, more or less of the calcareous and other material being precipitated or otherwise eliminated by suitable methods, if desired. The concentrated black liquor from the soda pulp process may be causticized by the action of quicklime and for this purpose powdered quicklime to the extent of some fifty per cent. or so thereof may be thoroughly and preferably quickly incorporated with the concentrated liquor which is preferably heated, or if desired sufficient heat may be otherwise supplied to this mixture or to the components thereof to insure the violent reaction and the elimination of considerable moisture from the materials, their incorporation taking place under any suitable conditions which insure the desired strong porous character of the causticized material finally produced. The violent reaction caused by the lime under these conditions not only more or less causticizes the soda which is then largely present in the form of sodium carbonate or in organic combination, so that it can combine more effectively with some of the organic acid components, but also generates considerable heat and liberates a large amount of steam within the mass which apparently contributes to the strong porous condition of the final product for the following reasons: When the reaction begins the heat developed by the slaking of the lime renders the mixture more fluent or mobile and the evolution of steam throughout the mixture thus effects the further mixing or stirring of the components throughout the mass which gradually stiffens and becomes thoroughly porous as the moisture is eliminated so that it permanently hardens on cooling. The causticized material which may be thus formed containing considerable acetate compounds is permanently solid under dry distilling conditions so as not to undesirably melt or foam in the retort or still and thus give trouble and prevent the uniform heating which is desirable in this connection. It is not, of course, necessary in all cases to incorporate as much as fifty per cent. of powdered quicklime with concentrated soda waste liquor containing about fifty per cent. of water, since the incorporation of forty per cent. or so of quicklime therewith gives a causticized material which can be further dehydrated in various ways so as to have a porous structure and then remains permanently solid under destructive distillation. Furthermore, in some cases where the concentrated soda waste liquor originally contains less water the percentage of incorporated quicklime may be correspondingly reduced to some extent, although it is desirable to have present not only ample quicklime or other alkaline material to combine with the organic material before and during destructive distillation, but also to be capable of rendering the porous causticized material permanently solid under distilling conditions. The soda in this causticized calcareous ligneous acetate material may be largely or practically completely converted into the caustic soda form where fifty per cent. or so of quicklime is used and this has the additional advantage that when the carbonized distillation residue is leached the dissolved soda is substantially in the caustic condition desirable for wood pulp cooking liquors so that further causticizing is unnecessary. The final porous causticized material may have a weight of only about forty pounds per cubic foot, and when water and so forth have been eliminated to the extent of some ten to twelve per cent. of the weight of the original components the material will substantially retain its form on moderate heating, that is, will not melt when heated to 500 degrees centigrade or so. While it is desirable to quickly incorporate the caustic lime with the concentrated liquor to effect its causticizing and conversion, the plastic mass should not be unduly agitated or kneaded for too long a time after steam begins to be evolved, since this may allow the steam to escape too readily and completely, and render the final hardened mass undesirably dense and impervious, or even reduce it to a dehydrated powdery condition.

This causticizing action may be conveniently effected by thoroughly incorporating or tumbling the components in any desired way as in a rotary mixer such as a rotating cement mixer, preferably used without internal ribs or agitators, or if desired, a sheet metal cylindrical mixing drum may be used preferably mounted in a substantially horizontal position and having means to rotate it at the desired speed about its axis. The charge of waste soda liquor concentrated to about 1.30–1.34 specific gravity so as to contain about fifty per cent. of water may be run while hot from the evaporators into such a mixing drum, and the desired amount of powdered quicklime quickly added or placed in the drum before the liquor, and the drum started so that it more or less quickly reaches the desired speed of about twenty-five to thirty revolutions per minute for a drum about six feet in internal diameter, the tumbling action of the rotating drum quickly incorporating or mixing the charge of reacting materials. After a few minutes the reaction usually takes place sufficiently so that the mixing drum can be stopped to allow the evolution of steam within the mass which is rendered porous and quickly swells or increases in bulk somewhat like thick boiling sugar, and after a time the mass increases in consistency, or if desired, the stiffening material may be allowed to form during this stage of the process an adherent ring or layer around the inside of the revolving drum four to six inches or so thick which to some extent retains its position due to centrifugal action so that the further kneading or agitation of its components is minimized, the evolution of steam aerating or rendering porous the plastic material which seems to harden as it loses moisture, thus being apparently rendered more uniformly porous. After such a mixing drum has been rotating five to ten minutes or so the reaction has usually progressed sufficiently under these conditions so that the stiff though still plastic hardening mass of causticized material, from which the free moisture has been largely eliminated, may with advantage be discharged from the drum and allowed to cool.

This causticized organic material which for convenience in designation has been termed "calignate," or porous causticized calcareous ligneous acetate material, is of a brownish color and has a porous cellular structure penetrated by different sized air cells or passages, the large proportion of these voids being indicated by the fact that material which weighs some thirty-eight to forty pounds per cubic foot is composed of particles which have an actual specific gravity of about 1.9. This causticized organic material has very considerable strength, and after it has been allowed to harden, is in some cases about as strong and rigid as wood; some samples which were shaped or formed into two-inch cubes giving when tested under compression like ordinary cement samples compression strengths per square inch of 612 pounds, 920 pounds and 987 pounds respectively. This combination of strength and porosity which is substantially uniform in all directions throughout the material is of course highly advantageous in promoting the evolution of vapors and gases from the mass during calcination or distillation, in which the large amount of substantially uniformly and intimately incorporated or combined inorganic material is also advantageous. The material may in some cases be dry distilled without considerable agitation as when it is arranged in vertical or stationary retorts; although it seems more desirable to reduce the causticized material to more or less uniformly sized lumps or particles of say, a half or a quarter inch diameter more or less and distil them in a rotary retort or other still chamber where they can be agitated and thus more uniformly and gradually heated. Under these conditions their permanently solid condition and their strong porous character are advantageous in preventing melting or foaming and also in preventing evolution of dust which might be carried into the vapor or condenser passages.

This causticized calcareous ligneous acetate material may advantageously be calcined or distilled in a revolving retort externally heated to bring the material to a temperature of about 600 to 700 degrees Fahrenheit or so and the water and other volatile material is driven off, leaving after six to nine hours or so a porous black granular mass consisting substantially of caustic soda, lime and a relatively small proportion of carbon, the other organic material having been converted into fixed and condensible gases which may with advantage be condensed and separated in suitable rectifying apparatus so that acetone and considerable amounts of other ketone volatile solvents and heavier oils and ammonia may be recovered and the fixed gases burned or otherwise used. It is usually desirable to introduce wet or superheated steam into the retort during this step of the process, since it seems to modify or lessen the evolution of volatile material if this action tends to become too vigorous. The calcined residue may be leached with water to recover the soda therefrom and this may in some cases be done in the rotary retort in which the distillation occurred and in which if desired the causticized calcareous ligneous acetate material may be originally formed. Wet steam or water sprays may be injected into the retort so as to act on the calcined residue and first cool and then leach this material which may be agitated by the slow rotation of the retort, if desired. The steam produced by the heat originally contained in the calcined material may be used to eject the leached charge from the retort and the subsequent filtering or other separation of the leaching liquor may be effected in any suitable filtering or other apparatus before the reuse in the paper pulp manufacture or the like of this recovered soda which is in caustic condition due to the original lime causticizing action. The leached calcined residue may be further calcined in a rotary kiln or other apparatus so as to burn off any remaining carbon or other organic material and to recausticize the lime and convert it into quicklime so that if desired it may be reused in this process in causticizing the concentrated waste liquor.

A sample of this causticized organic material when tested under coal analysis conditions contained about 3.87 per cent. moisture, 20.31 per cent. of other volatile organic matter, 2.76 per cent. of fixed carbon and 72.97 per cent. of ash. The analysis of this resulting ash give the following result:

| | |
|---|---|
| Silicious matter | .05 |
| Ferric oxid and alumina | .94 |
| Lime, CaO | 52.62 |
| Carbon dioxid | 27.40 |
| Sodium oxid, $Na_2O$ | 17.05 |
| Sodium chlorid | 1.64 |
| Magnesia, MgO | .41 |
| | 100.11 |

This invention has been described in this application which is a continuation in part of my co-pending applications, Serial No. 64,526, filed December 1, 1915, and 73,131, filed January 20, 1916, that is, contains, subject matter taken therefrom, in connection with a number of illustrative embodiments, properties, forms, sizes, materials, proportions, temperatures, times, orders of steps, apparatus and methods of preparation and use, to the details of which disclosure the invention is not of course to be limited, since what is claimed as new and what is desired to be covered by Letters Patent is set forth in the appended claims.

I claim:

1. The strong porous uniformly permeable causticized ligneous acetate material having a weight of not more than about forty pounds per cubic foot and a crushing resistance of at least several hundred pounds per square inch and adapted for the production of acetone by dry distillation with steam and which is permanently solid under dry distilling conditions so as not to undesirably melt or foam and which comprises acetate compounds, a large proportion of ligneous material from wood pulp waste liquor and about fifty per cent. of incorporated lime on a calcium oxid basis.

2. The strong permeable calcareous ligneous acetate material and adapted for the production of acetone by dry distillation with steam and which is permanently solid under dry distilling conditions so as not to undesirably melt or foam and which comprises acetate compounds, a large proportion of ligneous material from wood pulp waste liquor and over forty per cent. of incorporated lime on a calcium oxid basis.

3. The strong porous uniformly permeable calcareous ligneous acetate material having a high crushing resistance and adapted for the production of acetone by dry distillation with steam and which is permanently solid under dry distilling conditions so as not to undesirably melt or foam and which comprises acetate compounds and a large proportion of ligneous material from wood pulp waste liquor with which has been incorporated and combined lime to the extent of not less than about eighty per cent. of the dry weight of the organic material present.

4. The strong porous calcareous ligneous acetate material and adapted for the production of acetone by dry distillation with steam and which comprises acetate compounds and a large proportion of ligneous material from wood pulp waste liquor with which has been incorporated and combined lime to the extent of not less than about fifty per cent. of the dry weight of the organic material present.

5. The strong permeable causticized calcareous ligneous acetate material having a weight of not more than about forty pounds per cubic foot and adapted for the production of acetone by dry distillation with steam and which is permanently solid under dry distilling conditions so as not to undesirably melt or foam and which comprises acetate compounds and a large proportion of ligneous material from woody waste liquor with which has been incorporated and combined quicklime to the extent of not less than about fifty per cent. of the dry weight of the organic material present.

6. The strong calcareous ligneous acetate material adapted for the production of acetone by dry distillation with steam and which is permanently solid under dry distilling conditions so as not to undesirably melt or foam and which comprises acetate compounds and a large proportion of ligneous material from vegetable fibrous material.

7. The process of producing strong porous causticized material from waste soda liquor from the production of wood pulp which comprises incorporating additional soda therewith and concentrating the waste liquor to about 1.32 specific gravity, in adding powdered quicklime to the hot concentrated liquor to the extent of about fifty per cent. thereof and tumbling the mixture to quickly and thoroughly incorporate the components and cause a vigorous chemical reaction causticizing the concentrated liquor and causing the evolution of steam and in allowing the evolved steam to render porous the hardening causticized material to a substantially uniform extent throughout to produce a hardened highly porous structure permeable in all directions and having about the strength of wood.

8. The process of producing strong porous causticized material from waste soda liquor from the production of wood pulp which comprises concentrating the waste liquor to about 1.32 specific gravity, in adding powdered quicklime to the concentrated liquor to the extent of about fifty per cent. thereof and tumbling the mixture to quickly and thoroughly incorporate the components and cause a vigorous chemical reaction causticizing the concentrated liquor and causing the evolution of steam and in allowing the evolved steam to render porous the strong hardened causticized material.

9. The process of producing strong porous causticized organic material from waste liquor from the production of wood pulp which comprises concentrating the waste liquor, in causticizing the concentrated liquor by quickly and thoroughly incorporating powdered quicklime with the hot concentrated liquor to cause a vigorous chemical reaction therewith and the evolution of steam and in allowing the evolved steam to render substantially uniformly porous the strong hardened causticized material.

10. The process of producing causticized organic material from waste liquor from the production of wood pulp and so forth which comprises concentrating the waste liquor to a thick syrup, in causticizing the concentrated liquor by thoroughly incorporating therewith powdered quicklime to the extent of about forty to sixty per cent. of the concentrated liquor to produce a hardened highly porous structure permeable in all directions and having about the strength of wood.

11. The process of producing strong porous causticized organic material from waste liquor from the production of wood pulp which comprises incorporating additional soda therewith and concentrating the waste liquor, in causticizing the concentrated liquor by thoroughly incorporating powdered quicklime with the concentrated liquor to cause a vigorous chemical reaction therewith and evolve steam while the causticized material is solidifying and hardening to produce a hardened highly porous structure permeable in all directions and having about the strength of wood.

NOEL STATHAM.